Figure 1:
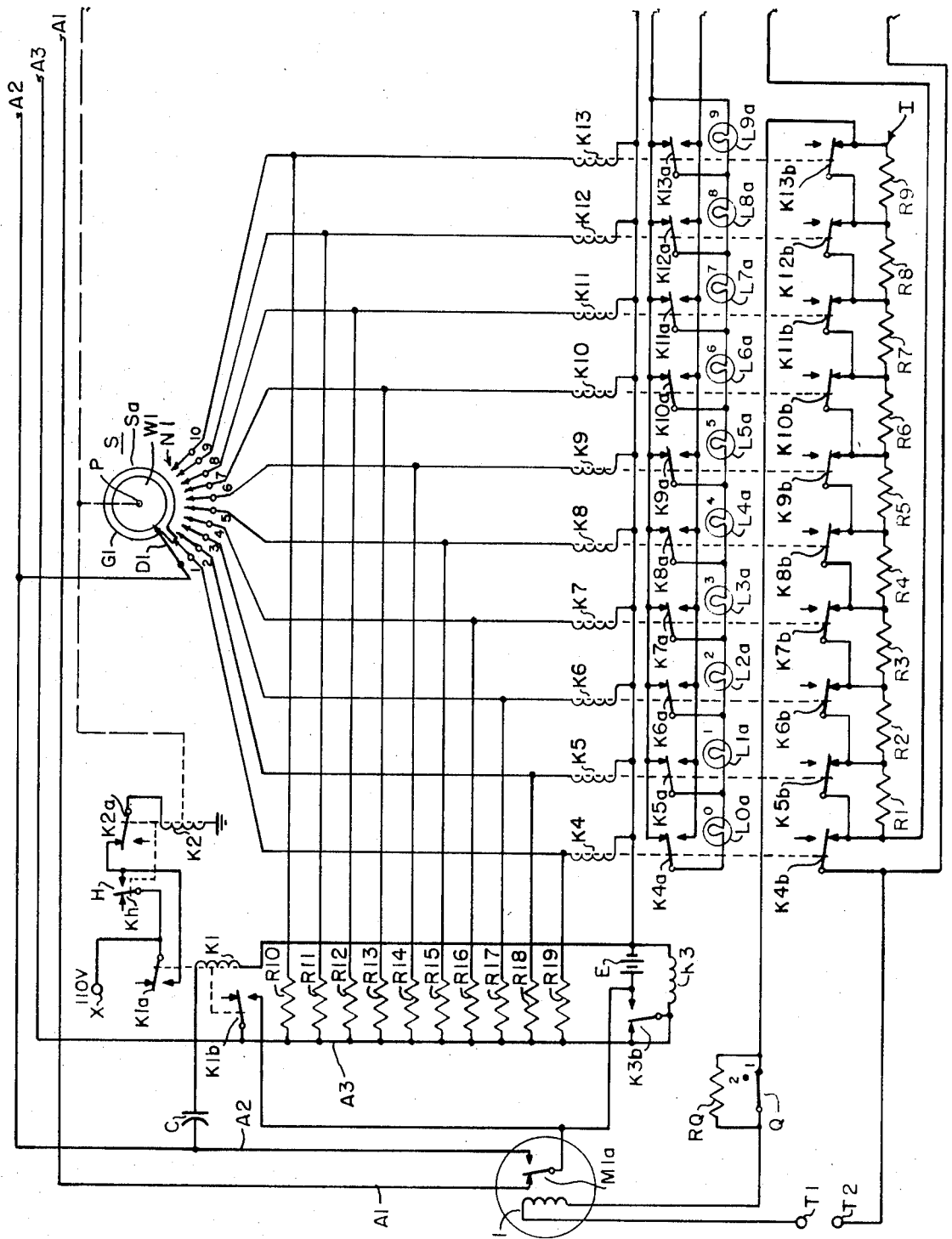
Figure 2:
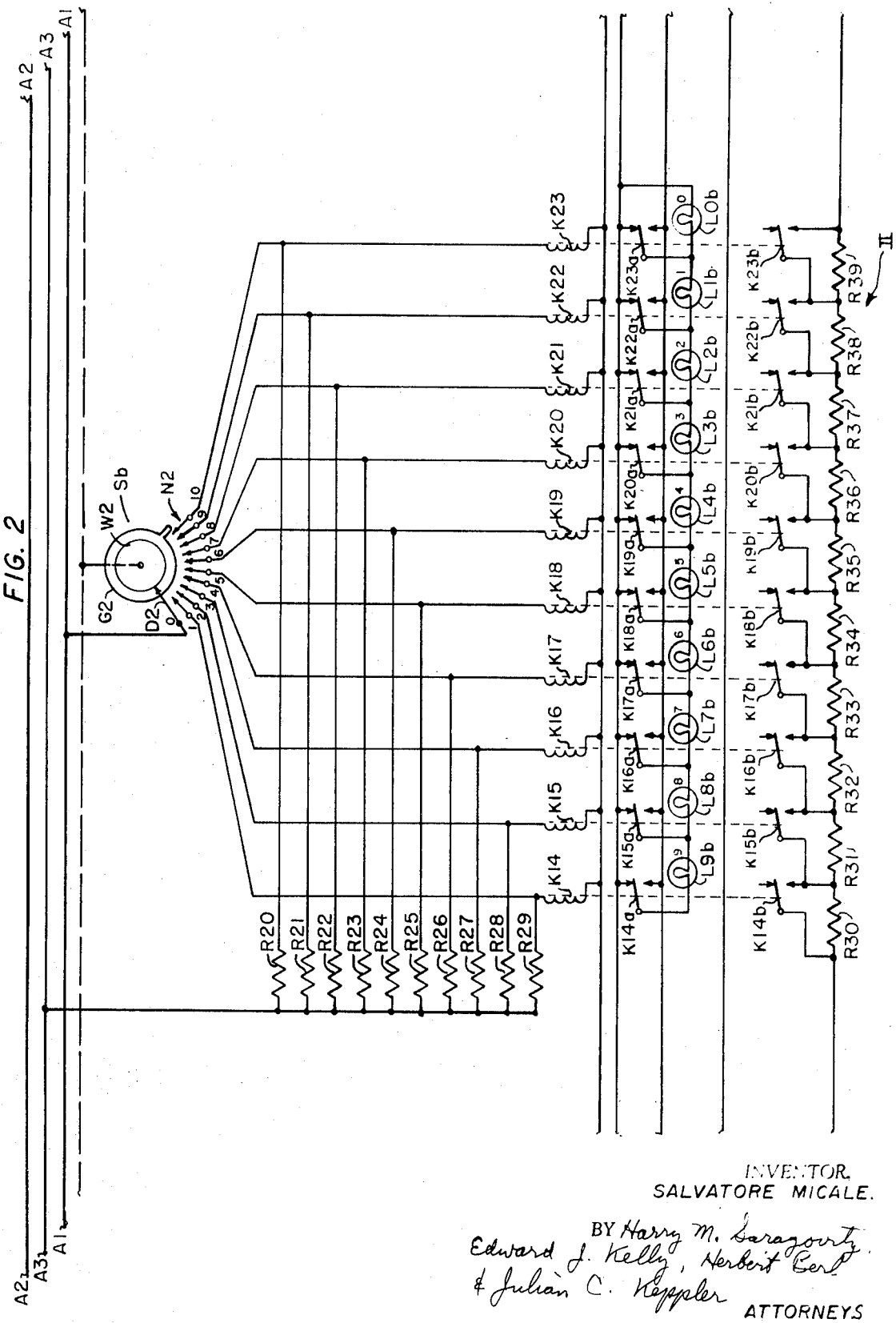
Figure 3:
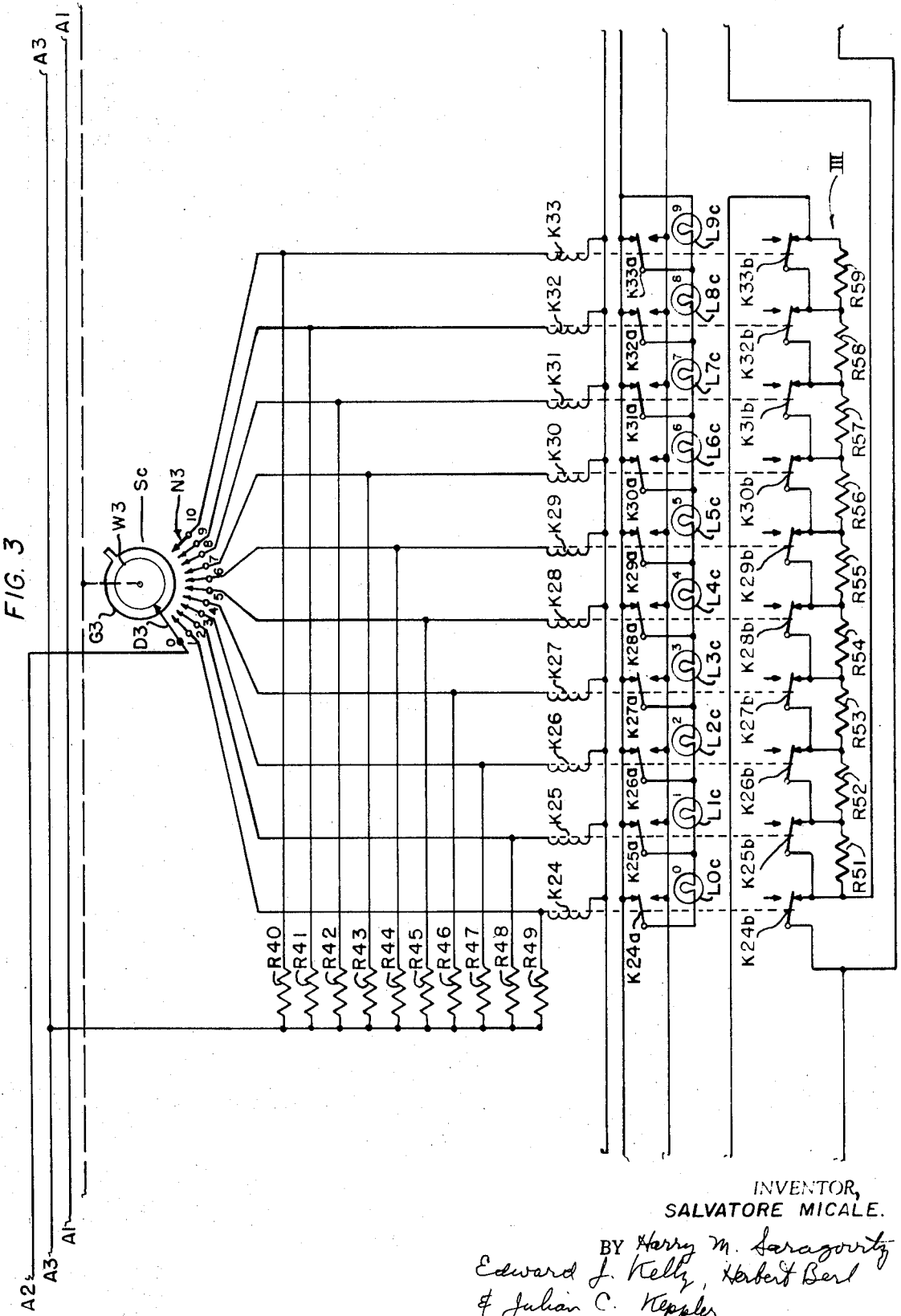

United States Patent

[11] 3,634,763

[72] Inventor Salvatore Micale
314 Benderemere Ave., Interlaken, N.J. 07712
[21] Appl. No. 35,545
[22] Filed May 7, 1970
[45] Patented Jan. 11, 1972
Continuation-in-part of application Ser. No. 586,005, Oct. 7, 1966. This application May 7, 1970, Ser. No. 35,545

[54] DIGITAL VOLTMETER USING ADAPTIVE CIRCUIT TECHNIQUES
6 Claims, 8 Drawing Figs.

[52] U.S. Cl. .................................................. 324/99 D, 340/347 AD
[51] Int. Cl. .......................................... G01r 17/06, H03k 13/14
[50] Field of Search ........................................... 324/99, 99 D, 98, 158; 340/347 AD

[56] References Cited
UNITED STATES PATENTS

| | | | |
|---|---|---|---|
| 3,284,709 | 11/1966 | De Paolo ....................... | 324/98 |
| 3,025,468 | 3/1962 | Thomas ......................... | 324/158 |
| 2,901,685 | 8/1959 | Alder ............................ | 324/99 D |

Primary Examiner—Rudolph V. Rolinec
Assistant Examiner—Ernest F. Karlsen
Attorneys—Harry M. Saragovitz, Edward J. Kelly, Herbert Berl and Daniel D. Sharp ABSTRACT: A digital voltmeter which does not require comparison of the unknown voltage with a reference voltage and, which, during periods of no input voltage, does not consume energy. The voltmeter of the invention essentially is a constant current device wherein resistance from one or more resistor banks is added or deleted in stepwise fashion in series with a sensing relay coil, this series circuit being connected directly across the unknown voltage terminal. This voltmeter is adapted to measure voltages accurately to within a minimum digital increment of voltage which depends upon the sensitivity of the sensing relay coil. The current-sensing relay coil has a current threshold equal to the ratio of the minimum increment of voltage to be measured and the resistance of said sensing relay coil. The sensing relay includes a contact which moves back and forth between two positions, depending upon whether the current in the aforesaid circuit is greater than or less than a predetermined threshold value. The amount of resistance in the current path is partially dependent upon the position of said contact and will be governed by the magnitude of the unknown voltage. The digital voltmeter also includes a plurality of banks of relays associated with each bank of resistors and indicating means associated with said relay banks. The magnitude of each of the resistors in the various resistor banks is digitally related to the magnitude of the resistors in the other banks. There are $n$ banks of resistors, where $n$ is the number of digits of the voltage to be measured. The magnitude of all resistors of a given resistor bank is equal and the magnitude of the resistors of the successive resistor banks, representing successively lower significant digits, decreases by a factor of 10. The resistance of the sensing relay coil must be equal to or less than one-tenth of the value of the resistance of each resistor of the resistor bank corresponding to the least significant digit of the voltage to be measured in order to insure accurate measurement of voltage. The voltmeter also includes a switch which sequentially applies a direct current voltage to the various relays of a corresponding relay bank when the contact of the current sensing relay is in one of its two positions. As each relay of the various banks is actuated in sequence, its contact either places a short circuit across, or removes a short circuit from, one or more of the resistors. All relays associated with a given bank of resistors which were actuated prior to reversal of the position of the current sensing relay contact are held closed by holding current. The current in the sensing relay coil goes through the threshold as many times as a digit of voltage is selected. In a first type of circuit, a bank of resistors in which all resistance is shorted out is disposed initially in circuit with the current sensing relay coil, while in a second type of circuit the shorting contact of a holding relay initially is in circuit with the sensing relay winding. In either type of circuit, the current increases from zero to above threshold upon appearance of an input voltage.

Control means are provided in this voltmeter responsive to the threshold current flowing through the relay sensing coil for sequentially selecting resistors from the various banks effectively placed in series with the relay sensing coil across the terminals of the voltage to be measured until the voltage drop across the selected resistances from the various banks of resistors is substantially equal to the input voltage to be measured, for input voltages which are at least equal to said minimum increment of voltage.

INVENTOR
SALVATORE MICALE.

BY Harry M. Saragovitz
Edward J. Kelly, Herbert Berl
& Julian C. Keppler
ATTORNEYS

INVENTOR,
SALVATORE MICALE.

BY Harry M. Saragovitz
Edward J. Kelly, Herbert Berl
& Julian C. Keppler
ATTORNEYS

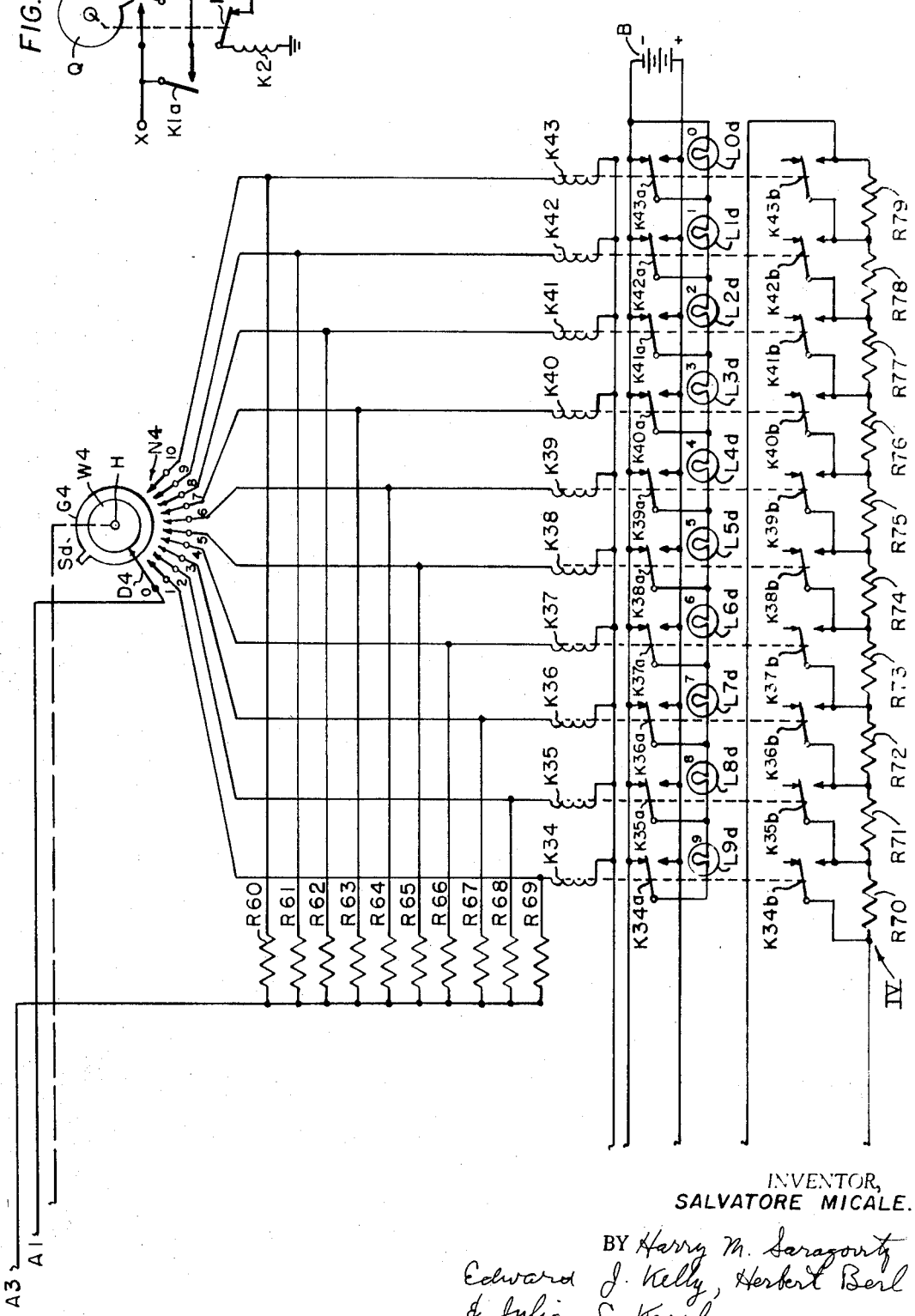

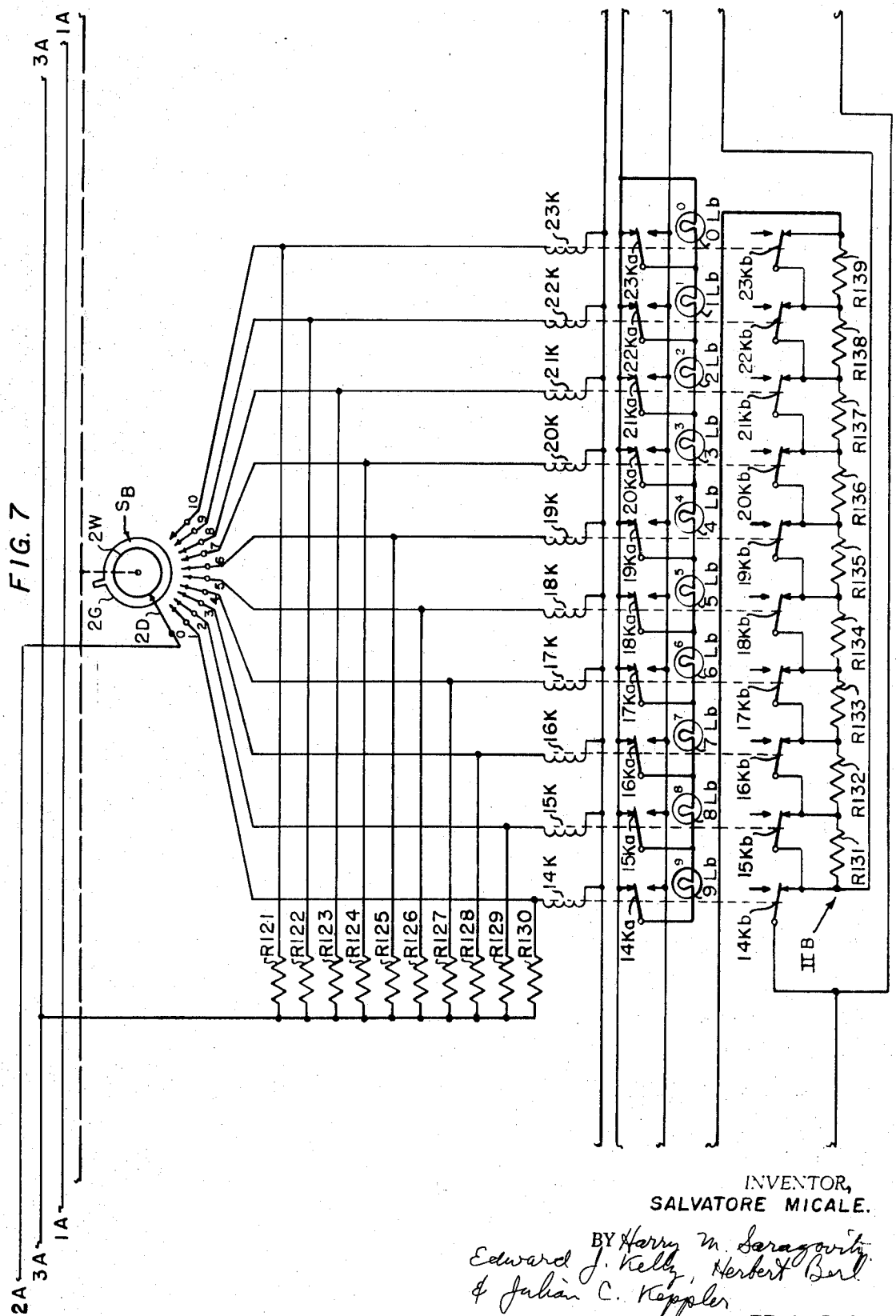

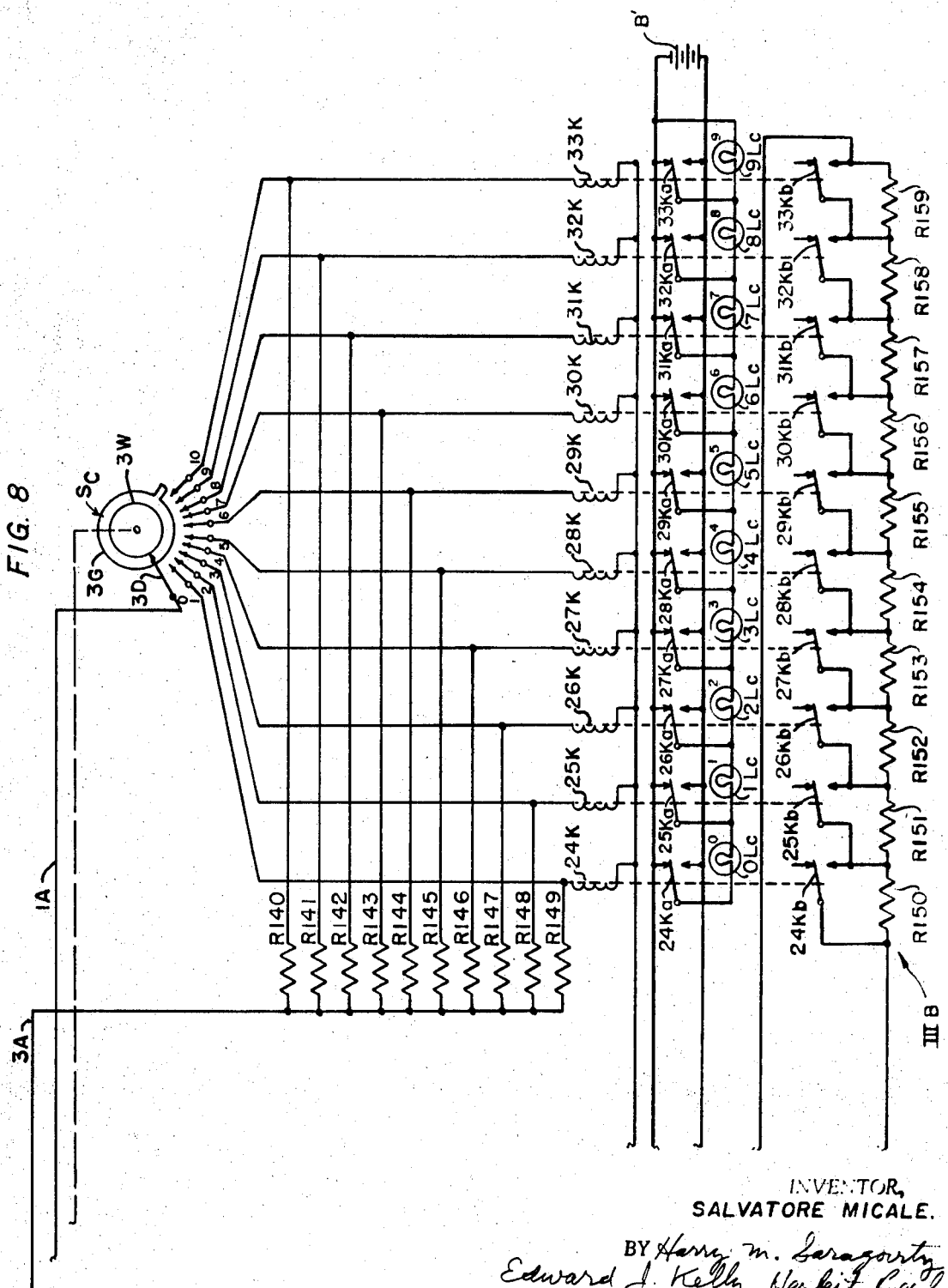

DIGITAL VOLTMETER USING ADAPTIVE CIRCUIT TECHNIQUES

This application is a continuation-in-part of Ser. No. 586,005, filed on Oct. 7, 1966. The invention described herein may be manufactured, used, and licensed by or for the government for governmental purposes without the payment to me of any royalty thereon.

This invention relates to a digital voltmeter which does not require comparison of the unknown voltage with a reference voltage and which, during periods of no input voltage, does not consume power.

Digital voltmeters of the prior art invariably have made use of a comparison of the unknown voltage and the voltage of a standard cell or other voltage reference. Such digital voltmeters have two principal disadvantages; firstly, such voltmeters require a power supply which constantly consumes power, whether or not a voltage is present at the input terminals and, secondly, a standard cell is required which often requires calibration and which may be difficult to replace, especially in military applications in the field.

The digital voltmeter in accordance with the invention, on the contrary, does not consume power during periods of no input voltage and, furthermore, does not require a standard cell or other precision voltage source.

The voltmeter according to the invention essentially is a constant current device wherein resistance from several resistor banks is added or subtracted in stepwise fashion in a current path which includes the voltmeter. The magnitude of each of the resistors in the various resistor banks is digitally related to the magnitude of the resistors in the other banks. The aforesaid current path, which includes a sensing relay coil, is connected across the unknown voltage terminal of the device.

The sensing relay includes a contact which moves back and forth between two positions, depending upon whether the current in said current path is greater than or less than a predetermined threshold value. The amount of resistance in the current path is partially dependent upon the position of the aforesaid contact and will be governed by the magnitude of the unknown voltage.

The digital voltmeter according to the invention includes, in addition to the sensing relay which operates when the current exceeds a given threshold and the plurality of banks of resistors, a like plurality of banks of relays associated with each bank of resistors and indicating means associated with said relay banks. The range of voltage which is accurately measurable by the voltmeter according to the invention depends upon the sensitivity of the sensing relay and upon the magnitude of the resistances in circuit with the relay and the input voltage when the latter is at the maximum value of said range. There are $n$ banks of resistors, where $n$ is the number of digits of the voltage falling within the aforesaid range; each succeeding bank is adapted to measure a successively less significant digit of voltage. The magnitude of all resistors of a given resistor bank are equal and the value of resistance of each resistor in the banks corresponding to successively more significant digits is 10 times, 100 times, 1,000 times, etc., the value chosen for the resistors of the resistor bank corresponding to the least significant digit. In referring subsequently to the resistors in the various banks, the resistors in the bank corresponding to the most significant digit will be referred to as R ohm resistors, those in the next resistor bank corresponding to the next lower significant digit will be referred to as R/10-ohm resistors, and so forth. In order for the least significant digit of the voltage to be measured to be accurate, it is essential that the resistance of the sensing relay coil be equal to or less than one-tenth of the resistance chosen for each resistor in the resistor bank corresponding to the least significant digit of the voltage to be measured. The voltmeter also includes a stepping switch having $n$ levels each rotating into ten positions through $360°/n$ which sequentially applies a direct current voltage from a battery to the various relays of a corresponding relay bank when the contact of the switching relay is in one of its two (operative or inoperative) positions. As each relay of the various banks is actuated its contact either places a short circuit across, or removes a short circuit from, one or more of the resistors. All relays associated with a given bank of resistors which were actuated prior to reversal of the position of the sensing relay contact are held closed by holding current.

The sensing relay is adjusted so that, for the smallest increment of voltage to be measured, the current through the sensing relay winding will be sufficient to move the contact of the sensing relay from a first or inoperative position to a second or operative position. The level at which the sensing relay contact reversal occurs will be relatively low, for example, 10 microamperes.

Prior to application of the unknown voltage, the sensing relay is inoperative, that is, the current therethrough is less than 10 microamperes. As soon as an input voltage appears at the input terminals, it is necessary that the sensing relay becomes operative. The sensing relay operates upon arrival of the input voltage since the entire resistance of the current path across which the unknown voltage is applied initially consists only of the very low resistance of the sensing relay.

In a first type of circuit, a bank of resistors in which all resistance is shorted out is disposed initially in circuit with the sensing relay winding, while in a second type of circuit the shorting contact of the holding relay initially is in circuit with the sensing relay winding. In either type of circuit, the current increases from zero to above threshold upon appearance of an input voltage.

In the case of the first type of circuit, when the sensing relay contact is in the second or operative position, a battery is coupled to the first level of the stepping switch by way of the sensing relay contact and a start relay winding to initiate movement of the first level of the $n$-level stepping switch. At the same time, the holding relay is energized. The battery is coupled also to the third and further odd levels, if any, of the stepping switch while the output of the sensing relay is in the operative position. When the contact of the sensing relay is in the inoperative position, the battery is coupled to the second and other even levels, if any, of the stepping switch.

In this first type of circuit, all of the resistance in the resistor bands initially is shorted out and the current through the sensing relay exceeds the threshold. Consequently, the sensing relay contact is in the operative position and battery voltage is made available by way of the first level of the stepping switch to the various relays of the first bank of relays in sequence. It is necessary now to add resistance into the input circuit until the current in the sensing relays falls below the threshold. As the first level of the stepping switch reaches the first of its 10 positions, the first relay operates to remove a short across a second bank of resistors and effectively adds all 10 of the R/10-ohm resistors of the second resistor bank in circuit with the sensing relay. If the first digit of the voltage is zero, the sensing relay current drops below threshold and no resistance from the first bank can be introduced; if, however, the first digit of the voltage is other than zero, the current will not have dropped to the threshold, and as the first level of the stepping switch continues to advance, individual R-ohm resistors are added to the ten R/10-ohm resistors already in the circuit. Eventually, the current is dropped to below threshold and the sensing relay becomes inoperative. The battery voltage no longer is available to energize remaining relays associated with the first bank of resistors and the relays of the first bank which have been actuated prior to attainment of the inoperative position of the sensing relays will be held closed by holding current and any resistance from the first and second banks of resistors in the input circuit will remain in the circuit.

As the second level of the stepping switch advances, the relay associated with corresponding resistors of the second bank of resistors are actuated to sequentially short out the corresponding resistors. In this way, as each R/10-ohm resistor is effectively removed from the input circuit, the current increases until threshold is reached. Then the sensing relay contact moves to the operative position and no further reduction in resistance is made.

As the third level of the stepping switch advances to the first of its 10 positions, the first relay of the third relay bank is actuated to remove the short across the fourth bank of ten R/1,000-ohm resistors. Thus, all 10 of the R/1,000-ohm resistors. Thus, all 10 of the R/1,000-ohm resistors of the fourth resistor bank are introduced as a unit in circuit with the resistors from the first and second resistor banks already in the circuit. The current thus decreases as soon as these 10 resistors are introduced. If the current has not already dropped below threshold, as soon as these 10 resistors are inserted, the third level of the stepping switch will advance and continue to be coupled to the battery voltage; as the third level advances, an additional R/100-ohm resistor from the third resistor bank will be added to the circuit. Eventually, the current will drop sufficiently to deenergize the sensing relay; the contact of this relay will move to the inoperative position, precluding further actuation of relays of the third bank and further insertion of resistors from the third bank into the circuit.

Since the sensing relay contact is in the inoperative position, the battery voltage is available at the fourth level of the stepping switch for actuation of the relays of the fourth relay bank. As the fourth level of the stepping switch advances to each of its ten positions, actuation of a corresponding one of the relays of the fourth relay bank will place a short circuit across the corresponding R/1,000-ohm resistor and the current will increase incrementally until the threshold again is reached, at which time further removal of resistance ceases and the operating cycle is completed. The stepping switch then returns to the home position and awaits a change in input voltage. If more digits are desired, additional pairs of levels would be added and the additional pairs would operate in the same fashion as the pairs of the immediately preceding levels; for example, the fifth and sixth levels, if any, would operate like the third and fourth levels, respectively.

In the case of the second type of circuits, when the sensing relay contact is in the first or inoperative position, a battery is coupled to the first level of the stepping switch by way of the sensing relay contact and a start relay winding to start rotation of the first level of the $n$-level stepping switch. The holding relay simultaneously is energized. The battery is coupled to the third and to further odd levels of the stepping switch while the contact of the sensing relay is in the inoperative position; when the contact of sensing relay is in the operative position, the battery is coupled to the second and other even levels, if any, of the stepping switch.

As soon as the input voltage appears at the input terminals, the shorting contact of the holding relay opens and combined resistance of 10R ohms of the first bank of resistors is placed in circuit with the input voltage. This introduction of resistance reduces the current to less than threshold and the sensing relay contact will move to the inoperative position. As the first level of the stepping switch moves to the first of its 10 positions, a short is placed across one of the R-ohm resistors, that is, R ohms is removed from the input circuit and the current therein increases. As the first level of the stepping switch continues to advance from each position to the next, another R-ohm resistor will be removed from the input circuit until the current has increased sufficiently for the sensing relay to operate and for its contact to move to the operative position. This causes the battery voltage to be removed from the remaining relays of the first bank of relays associated with said first bank of resistors and no further removal of resistance from the first resistor bank will occur.

As the second level of the stepping switch advances to the first of its ten positions, the first relay of the second bank of relays is operated and a short circuit is removed from across the third bank of ten R/100-ohm resistors; 10 such resistors are then introduced as a unit into the input circuit along those already inserted from resistor bank number I. The current consequently will be reduced and may immediately fall below threshold, if not, an additional R/10-ohm resistor is added to the resistance already in in the input circuit for each position of the second level of the stepping switch until eventually the current will fall below threshold and the sensing relay contact will move to its inoperative position. The actuating voltage then is removed from the remaining relays of the second bank of relays and no further resistors will be added from the second resistor bank.

Each time the third level of the stepping switch advances to each successive one of its 10 positions, an R/100-ohm resistor is shorted out by actuation of a corresponding relay in the third relay bank so that the effective resistance of the third resistor bank in circuit with the effective resistance already retained in the first and second resistor banks is decreased. The current consequently increases in stepwise fashion until, at one of the positions of the third level of the stepping switch, the current reaches the threshold and the contact of the sensing relay moves to its operative position. The actuating voltage is removed from the remaining relays of the third relay bank and not further resistance is removed from the third resistor bank.

Figure 6:
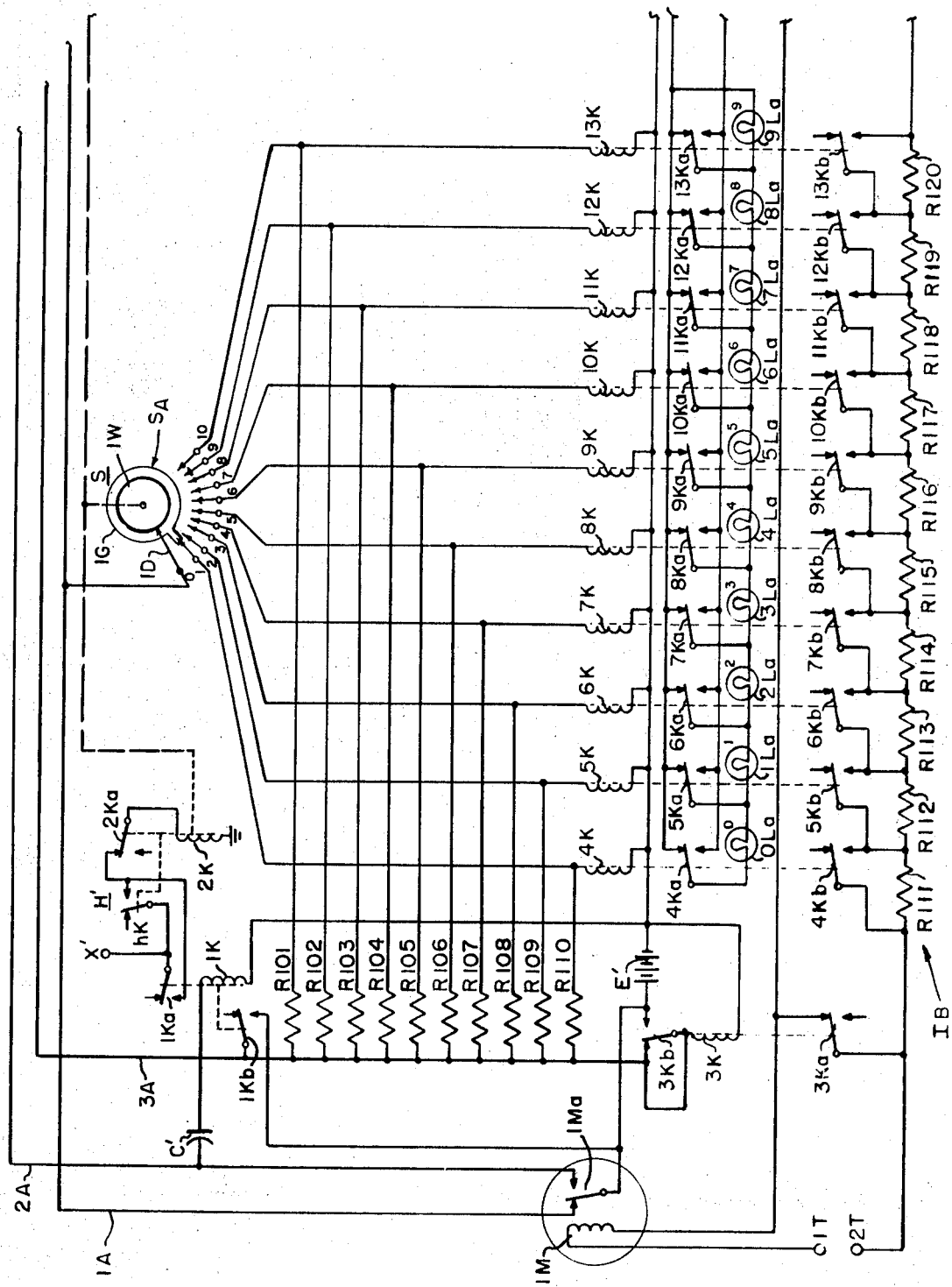

If there are but three levels, this completes the cycle of operation and the stepping switch returns to its home position to await either a change in, or return of, input voltage, as the case may be. If additional digits are desired, pairs of additional levels may be added. For example, a five-digit system would use five levels; in this example, the fourth level would be similar to the second level and the fifth level similar to the third level. Other objects of this invention will become apparent from the detailed description of certain embodiments of the invention as shown in drawing wherein FIGS. 1 to 4 illustrate circuit diagrams of a first embodiment of a digital voltmeter according to the invention;

FIG. 5 is a diagram illustrating certain details of switching operations; and FIGS. 6 to 8 illustrate a second embodiment of digital voltmeter according to the invention. The digital voltmeter shown in FIGS. 1 to 4 include a sensing relay M1 having a contact M1a which can move to one of two operative positions. The sensing relay sensitivity is determined by the maximum voltage to be measured and by the resistance placed in circuit with the unknown voltage when the latter is at its maximum value. For example, with the system shown in FIGS. 1 to 4, if the maximum voltage to be measured is 1 volt, the product of current and resistance in the circuit is made equal to 1 volt. Since the resistance which is in circuit with a voltage of 1 volt is the total resistance of the four banks of resistors, or 100,000 ohms, the current required to operate the sensing relay M1 is given by $1.000/100000 = 10$ microamperes. A switch Q is in the number 1 position and the resistor RQ, whose purpose later will be described, is disconnected from the input circuit.

With no input voltage at input terminals T1, T2, the contact M1a of sensing relay M1 initially is in the left-hand or inoperative position. The contacts K4b to K13b of the first bank of relays K4 to K13 are in the downward or closed position, while the contacts K14b to K23b of the second bank of relays K14 to K23 are in upward or open position. Furthermore, the contacts K24b to K33b of the third bank of relays K24 to K33 are in the downward or closed position and the contacts K34b to K43b of the fourth bank of relays K34 to K43 are in the upward or open position.

From the examination of FIGS. 1 to 4, it is evident that the resistors R1 to R9 of the first resistor bank I are shunted out by the relay contacts K5b to K13b, respectively, and the resistors R30 to R39 of second resistor bank II are shorted out by the closed contact K4b of relay K4. Similarly, the resistors R51 to R59 of third resistor bank III are shorted out by the closed contacts K24b to K33b and, finally, the resistors R70 to R79 of the fourth bank of resistors IV are shorted out by the closed contact K24b to relay K24. None of the resistors of the four banks of resistors are initially in circuit with the input voltage and the only resistance initially in circuit with an input voltage at input terminals T1, T2 is the very small resistance of the sensing relay winding itself. Relatively high current flows through this low-resistance current path and operates the sensing relay M1, whereupon contact M1a moves to the operative (right-hand) position. A current path then is established through capacitor C, the winding of start relay K1 and battery E and the current through this path causes closure of contacts K1a and K1b of start relay K1.

With contact M1a in the operative position, the voltage from battery E is made available along line A2 to the stationary contact arm D1 of section $S_a$ of a stepping switch S. In the drawing, the fourth individual sections of stepping switch S are indicated by the reference characters $S_a$, $S_b$, $S_c$, and $S_d$. In practice, the four sections each may comprise a bank of spaced stationary contacts N1 numbered 1 through 10, a rotating wafer W1 mounted to rotate on a shaft P, a stationary contact arm D1 and a rotating contactor G1. The tip of rotating contactor G1 wipes across the corresponding stationary contacts 1 to 10 in succession. As rotating contactor G1 reaches the end of the bank of stationary contacts of switch level $S_a$, the rotating contactor G2 of the next switch section $S_b$ is in position to start wiping across the stationary contacts of switch section $S_b$, etc. Each of the rotating contactors G1 to G4 are displaced angularly from the preceding one by $360°/n$ where $n$ is the number of switch sections or levels. The positive terminal of battery E is connected to the stationary contact arm D1 of a given stepping switch section $S_a$, $S_b$, $S_c$, or $S_d$ by way of either one of leads A1 or A2. The current path is through a given stationary contact arm D1, an electrically conductive portion of rotary wafer W1, rotating contactor G1 on wafer W1 and one of the stationary switch contacts N1, the position of stationary contact arm D1 depending upon the position of the shaft P of stepping switch S.

A homing switch H, shown in FIGS. 1 and 5, includes a rotary portion Q ganged to the contact K2a of stepping relay K2; the rotary portion Q has a cam follower which holds the homing switch contact Kh open in the home position. Upon closure of contact K1a of start relay K1, current from a 110-volt DC voltage source at terminal X passes through closed contact K1a and the initially closed switch contact K2a. The stepping relay K2 is energized and contact K2a opens; the switch Kh is open since the cam follower has not yet moved away from the home position. Since relay contact K2a now is open, there is no further energization of relay K2 and contact K2a returns to its normally closed position. During this return movement, a spring-loaded pawl is released and pushes the ratchet wheel away from the home position so that the cam follower leaves the home position and closes contact Kh. The cam follower remains away from the home position and, hence, contact Kh stays closed until 360° of rotation of the homing switch has been achieved. As current from battery E ceases because of the fact that capacitor C is fully charged, contact K1a opens. This contact remains open until the next home position of homing switch H has been reached. The 110-volt supply is connected in circuit intermittently by stepping relay K2 through the closed homing switch Kh and contact K2a, provided that the latter is closed. The contact K2a of stepping relay K2 alternately opens and closes during the time that the homing switch contact Kh is closed; with each opening of stepping relay contact K2a, the shaft carrying the three rotary contactors G1, G2, and G3 of the stepping switch S is advanced. As mentioned previously, the stepping switch S includes four discrete sections $S_a$, $S_b$, $S_c$, and $S_d$, each having 10 active positions marked 1 to 10 in the drawing. Corresponding positions of the switch sections $S_a$, $S_b$, $S_c$, and $S_d$ of FIGS. 1 to 4 are angularly displaced by $360/4=90°$. The contacts of stepping switch section $S_a$ are engaged by the tip of rotary contactor G1 in succession, then the 10 contacts 1 to 10 of stepping switch section $S_b$ are engaged successively by the tip of rotary contactor G2, next the tip of rotary contactor G3 engages the stationary contacts 1 through 10 of stepping switch section $S_d$ wipes across its contacts 1 through 10.

When start relay contacts K1b closes, as the result of operation of sensing relay M1, current flows through holding relay K3 and contact K3b moves to the right. Now current from battery E continuously flows through holding relay K3 by way of switch contact K3b. Current likewise continues to flow through contact K1b and through resistors R10 to R19 and corresponding relays K4 to K13. The resistors R10 to R19 are of such magnitude as to maintain the holding current through relays K4 to K13 at a value below the operating level but at a value sufficient to hold the relays energized once they have operated. Similarly, resistors R20 to R29 maintain the holding current through relays K14 to K23 below the operating level, resistors R40 to R49 maintain the holding current through relays K24 to K33 below the operating level and resistors R60 to R69 maintain the holding current through relays K34 to K43 below the operating level. All of the resistors R10 to R19, R20 to R29, R40 to R49, and R60 to R69 have one end connected to common bus A3.

For the sake of explanation, an input voltage of 0.0001 volt will be assumed. As mentioned previously, as soon as the input voltage appears at terminals T1, T2, the current flowing through the sensing relay M1 is quite high, being limited only by the very low resistance of the sensing relay winding. Consequently, sensing relay M1 operates and the contact M1 moves to the operative (right-hand) position. Initially, therefore, relays K4 to K13 of the first relay bank are inoperative and relay contacts K4b to K13b are closed. Similarly, relay K24 of the third bank of relays is inoperative and relay contact K24b is closed. With sensing relay M1 in the operative condition (contact M1a in the right-hand position) the voltage from battery E is applied over line A2 to the stationary contact arm D1 of the first section or level $S_a$ of stepping switch S. As the rotary contactor G1 moves past the stationary contacts 1 through 10 of switch section $S_a$, the voltage E is applied across relay windings K4, K5, K6, etc., in succession, provided the sensing relay M1 remains operative. In position 1 of switch level $S_a$, relay K4 operates, contact K4b opens and the short circuit is removed from the second bank R31 to R39 of resistors. The 10 resistors R31 to R39 of 1,000 ohms each are then in circuit with the sensing relay M1 and the unknown voltage. The current through the sensing relay and resistors R31 to R39 thus is substantially $0.0001/10000=0.01$ microampere. This current is much less than the operating level (10 microamperes) of sensing relay M1, whereupon contact M1a moves to the inoperative (left-hand) position. The voltage from battery E thus is removed from the stationary contact arm D1 of the first level $S_a$ of stepping switch S. Consequently, relays K5 to K13 cannot be energized when the stepping switch level $S_a$ is in positions 2 to 10. When relay K4 is energized, the relay contact K4a moves to the downward position and the "0" lamp LOa is placed in circuit with lamp battery B (shown in FIG. 4) by way of contacts K5a and K4a. Owing to the holding current through relay K4, contacts K4a and K4b remain in the operative position and "0" lamp LOa stays lit, even though the voltage from battery E has been removed from switch level $S_a$. Since sensing relay contact M1 is in the operative position, the voltage E is applied to the stationary contact arm D2 via line A1. The stepping switch meanwhile has moved so that the rotary contactor G2 of switch level $S_b$ is in position 1. Relay K14 is energized, whereupon contact K14b closes and contact K14a moves downwardly. The closure of contact K14b shunts resistor R31 of resistor bank II and reduces the resistance in circuit with the input voltage by 1,000 ohms from 10,000 ohms to 9,000 ohms. The current through sensing relay M1 now becomes $0.0001/9000=.011$ microamperes. This current is still below the operating level of sensing relay M1 so that contact M1a remains in the inoperative position. The "9" lamp L9b is lit since it is supplied with voltage from lamp battery B via contact K14a and K15a. When rotary contactor G2 rotates into contact with stationary contact 2 of stepping switch level $S_b$, relay K15 is energized, causing contact K15a to move downwardly and contact K15b to close. Note that contact K14a remains in the downward position and that contact K14b remains closed because of the holding current in relay K14. Closure of contact K15b shunts resistor R32 and further reduces the resistance in circuit with the input voltage by 1,000 ohms to a value of 8,000 ohms. The current in the input circuit now is 0.0001/8000=0.0125 microamperes. This current still is below the operating level of sensing relay M1. The "9" lamp L9b is extinguished and the "8" lamp L8b is lit since the voltage from lamp battery B is connected thereto by way of contacts K15a and K16a.

As the relays K16 to K22 are successively energized, an additional 1,000 ohms is shorted (removed from) the input circuit until, at position 9 of switch level $S_b$, relays K14 and K22 are energized, relay contacts K14b to K22b are closed and only the 1,000 ohms of resistor R39 is in circuit with the sensing relay M1. The current in sensing relay M1 is 0.0001/1000=.1 microampere. When the rotary contactor G2 reaches stationary contact 10 of switch level $S_b$, all of the relays K14 to K23 are energized, all relay contacts K14b to K23b are closed and all resistance is removed from the input circuit, except for the low resistance of the sensing relay winding. Relay contact K23a moves downwardly and a circuit is established from lamp battery B by way of contacts K22a and K23a to the "0" lamp LOb thereby lighting lamp LOb. Since the current in the sensing relay M1 now is much greater than the operating level, the sensing relay contact M1a moves to the operative position and voltage from battery E is applied via A2 to switch level $S_c$.

When the rotary contactor G3 reaches position 1 of switch level $S_c$, relay K24 is energized, whereupon contact K24a moves downwardly to energize "0" lamp LOc and contact K24b opens to remove the short across resistors R70 to R79 of fourth resistor bank IV. The resistance in circuit with sensing relay M1 now comprises the total resistance of the 10 resistors R70 to R79, or 100 ohms, so the current in sensing relay M1 becomes 0.0001/100=1 microampere. The current drops below the operating level of sensing relay M1 so that contact M1a moves to the inoperative position. The relays K25 to K33 cannot be energized since the connection from battery E via line A2 to the switch level C is broken. Therefore, lamp 0 remains lit and all the resistance in resistor bank III is shorted out by closed contacts K25b to K33b.

With relay contact M1a in the inoperative position, voltage from battery E is applied by way of line A1 to stepping switch level $S_d$. As soon as the stepping switch advances sufficiently for rotary conductor G4 to contact stationary contact 1 of switch level $S_d$, relay K34 is energized; thereupon, relay contact K34a moves downwardly and relay contact K34b closes. The "0" lamp LOd is placed in circuit with lamp battery B through contacts K34a and K35a. The resistance of resistor R70 is removed from the input circuit by closing of relay contact K34b, providing a combined resistance in input circuit of 90 ohms. The current in sensing relay M1 now is 0.0001/90=1 .1 microampere. As the rotary contactor G4 moves successively passed contacts 2 through 10, succeeding lamps are energized and an additional resistor of resistor bank IV is removed from the input circuit. For example, at position 9 of switch level $S_d$, relays K34 to K42 are energized, relay contact K34a to K42a are in the downward position and relay contacts K34b to K42b are closed. All resistance, save that of resistor R79, is removed from the input circuit and the resistance in series with sensing relay M1 is 10 ohms. The current in sensing relay M1 now is 0.0001/10=10 microamperes, the sensing relay M1 is energized and contact M1a moves to the operative position, thus opening the connection from battery E by way of line A1 to switch level $S_d$. Since, at switch position 10 of switch level $S_d$, there is no voltage from battery E available to switch level $S_d$, relay K43 cannot be energized; consequently, contact K43 is in the upward position and contact K43b is closed. A circuit through "1" lamp L1d is completed by way of contacts K42a and K43a and the "1" lamp L1d is lit. This completes the operating cycle and the homing switch arrives once more at the homing position. The 0, 0, 0, and 1 lamps of the respective first, second, third, and fourth banks of lamps are lit, indicating the magnitude of the voltage at input terminals T1, T2 is 0.0001 volt.

In many cases, it is desirable to measure a voltage which falls within a different 1-volt range than the range from 0 to 1 volt. This can be done by moving switch Q to position number 2, thereby inserting a resistor RQ in series with the sensing relay M1 of magnitude which is a multiple of R ohms. The multiple is determined by the minimum value of voltage in the desired range. For example, if one desires to measure voltages from 3 to 4 volts, then the resistor RQ should have a value of 30R ohms. In the particular example already described in detail, switch Q was in position 1, and the voltage was assumed to be 0.0001 volt. On the other hand, when switch Q is moved to position 2, the resistor RQ would be in the input circuit. If the value of resistor RQ is 300,000 ohms and all relay switch positions remain as shown in FIGS. 1–4, the voltage measured would be 3.001 volts.

The example already described was based on a network in which each of the resistors of the first, second, third, and fourth banks of resistors have respective magnitudes of 10,000 ohms, 1,000 ohms, 100 ohms, and 10 ohms. With switch Q in position 1, the range of measurable input voltages then would be 0.0001 volt to 0.9999 volt.

It should be noted that each of the resistors R1 to R9 of bank I could have been 100,000 ohms, the resistors R30 to R39 of bank II each 10,000 ohms, the resistors R51 to R59 of bank III each 1,000 ohms and the resistors R70 to R79 of bank IV each 100 ohms. With such an arrangement, the range of measurable input voltage would be 0.001 volt to 9.999 volt.

Similarly, if the resistors of banks I, II, III and IV were 1 megohm, 100,000 ohms, 10,000 ohms, and 1,000 ohms, respectively, the range of measurable input voltage would have been 0.01 to 99.99 volts.

A modified version of the digital voltmeter system of FIG. 1 to FIG. 4 is shown in FIGS. 6 to 8 of the drawing. This voltmeter system differs in some respects from that previously described. The system shown in FIGS. 6 to 8, by way of example, consists of three levels corresponding to three digits of voltage magnitude. The description that follows will be based on such a three-level system, although the system of FIGS. S6 to 8 could include any number of levels.

As in the preceding system, the sensing relay sensitivity is determined by the maximum voltage to be measured and by the resistance placed in circuit with the voltage to be measured when the latter is at its maximum. For example, if the maximum voltage to be measured is 1 volt, the product of current and resistance in the input circuit is made equal to 1 volt. The resistance in circuit with a voltage of 1 volt in the system of FIGS. 6 to 8 is the combined resistance in resistor bank IB (resistors R111 to R120) or 10 times 10,000 or 100,000 ohms. The current required to operate the sensing relay, therefore, is 1/100000 or 10 microamperes.

The contact 1Ma of sensing relay 1M initially is in the left-hand or inoperative position and holding relay 3K is deenergized. Consequently, contact 3Ka of the holding relay 3K is in the upward position, so that the input circuit is directly shorted by this contact. It will be noted that the contact 3Ka is not used to short out the input terminals 1T, 2T in the system previously described in FIGS. 1 to 4.

As soon as an input voltage appears at terminals 1T, 2T the current flowing through the low-resistance winding of sensing relay 1M and the shorting contact 3Ka is relatively high—the only resistance being that of the relay winding itself. Immediately, sensing relay 1M is energized and the contact M1a moves to the operative (right-hand) position. A current path is then established to capacitor C', the winding of start relay 1K and battery E' and the current flow in this path results of closure of contact 1Ka and 1Kb of start relay 1K. The energization of holding relay 3K has removed the short circuit across the input terminals 1T, 2T since contact 3Ka is now open. With contact 1Ma in the operative position, the voltage from battery E' is made available along line 2A to the stationary contact arm 1D of section $S_A$ of stepping switch S. In the drawing, the three individual sections or levels of stepping switch S are indicated by the reference characters $S_A$, $S_B$, and $S_C$, each of the three sections including a rotating contactor 1G and a bank of spaced stationary contacts numbered 1 through 10.

The operation of the stepping switch and the homing switch H' is identical to that described in the system of FIGS. 1 to 4. Corresponding positions of the switch sections $S_A$, $S_B$, and $S_C$ are angularly displaced by 360°/3=120°. The 10 active contacts of stepping switch section $S_A$ are engaged by rotating contactor 1G in succession. Next, the 10 positions 1 to 10 of stepping switch level $S_B$ are then engaged by rotating contactor 2G and finally, the rotating contactor 3G wipes across contacts 1 through 10 of switch section $S_C$ in succession.

When start relay contact 1K$b$ closes as the result of contact 1M$a$ of sensing relay M1 moving to the right, current flows through holding relay 3K and contact 3K$b$ moves to the right. Now current from battery E' continuously flows through holding relay 3K by way of switch contact 3K$b$. Current likewise continues to flow through contact 1K$b$ and individually through resistors R101 to R109 and corresponding relays 4K to 13K. The resistors R101 to R109 are of such magnitude as to maintain the holding current through relays 4K to 13K at a value below the operating level, but at a value sufficient to hold the relays energized once they have operated.

Immediately after receipt of an input voltage, and after sensing relay contact M1$a$ has moved from the left-hand to the right-hand position, all of the relays 4K to 13K are in the inoperative position and all contacts 4K$a$, 5K$a$ ... 35K$a$ are in the position shown in the drawing. At this time, consequently, the unknown voltage of input terminals 1T, 2T is in circuit with the low-resistance sensing relay M, the successive contacts 14K$b$ to 23K$b$ of the second bank of relays, and the entire resistance of first resistor bank IB comprising the resistors R111 to R120. The relay contact 14K$b$ effectively shorts out the resistance contained in resistor bank IIIB which comprises resistors R150 to R159. In other words, the resistance of resistor bank IIB comprising resistors R131 to R139 is shorted out by closed contacts 15K$b$ to 23K$b$, while the ten 100-ohm resistors (total of 1,000 ohms) of resistor bank IIIB is shorted across contact 14K$b$; consequently, except for the substantially negligible resistance of sensing relay 1M, only the combined resistance of resistor bank IB (equal to 100,000 ohms) is in circuit with the unknown voltage at the instant that the unknown voltage appears across input terminals 1T, 2T.

For the sake of explanation, an input voltage of 0.001 volt first will be assumed. Immediately after contact 1M$a$ has initially moved to the right-hand position, the rotating contactor W1 of switch section $S_A$ is in the zero position and the current in the circuit, by Ohm's law, is 0.001/100000=0.01 microampere. This current is much less than 10 microamperes (the operating level of sensing relay 1M) so the contact 1M$a$ moves over the left-hand position and voltage from battery E' is applied over line 1L to the stationary contact arm 1D of the first section or level $S_A$ of stepping switch S. As the arm moves past the contacts 1 through 10 of first switch level $S_A$, the voltage E' is applied across relay windings 4K, 5K, 6K, etc., in succession. As each relay 4K, 5K, etc., is energized, the associated contact 4K$b$, 5K$b$, etc., is closed and 10,000 ohms—the value of one of the resistors R111 of resistor bank IB—is shunted out of the input circuit. Concurrently, contacts 4K$a$, 4K$b$, etc., move downwardly and the lamp OL$a$, 1L$a$, etc., associated therewith is connected across lamp battery B'; this particular lamp remains lit until the next relay contact K4$b$, etc., closes at which time the lamp battery B' no longer is connected to this lamp and this lamp is deenergized. By the time switch $S_A$ has moved to position 1, in the manner already described, a closed circuit including battery E' is established through stationary contact arm 1D of switch level $S_A$, rotating contactor 1G of switch level $S_A$ and relay 4K. The current flowing through relay 4K from battery E' causes contact 4K$a$ to move downwardly. Lamp battery B' now is connected across the "9" lamp 9L$a$ by way of contact 4K$a$ and 5K$a$ and is illuminated. Also, contact 4K$b$ is closed, thereby shunting 10,000 ohms from the input circuit. With resistor R111 thus removed by closure of 4K$b$, the 0.001-volt input is in series with 90,000 ohms of resistor bank IB; the current now increases from 0.01 $\mu$a. to 0.001/90000=0.011 microampere. This current still is less than 10 microamperes, so the sensing relay contact 1M$a$ remains in the left-hand position and voltage E' is still applied to switch $S_A$ by way of line 1A. The switch now steps to position 2 and relay 5K is energized. Contact 5K$a$ moves downwardly, while contact 4K$a$ still is held in the downward position because of the holding current through previously operated relay 4K. The "8" lamp 8L$a$ is lit since it is connected across lamp battery B' by way of contacts 5K$a$ and 6K$a$. Lamp 9L$a$ is extinguished, since, with contact 5K$a$ in the downward position, the supply circuit to lamp 9L$a$ is open. Contact 5K$b$ closes and shorts out another 10,000-ohm resistor, namely resistor R112, of resistor bank IB. Contact 4K$b$ now remains closed because of the holding current flowing in relay 4K, so that resistor R111 still is shorted out. Now the input voltage is applied across 80,000 ohms and the current increases to 0.001/80000=0.0125 microampere.

It will be evident that, each time the stepping switch moves toward position 10, 10,000 ohms will have been removed from the input section and the current gradually increases. At position 9 of the switch $S_A$, the current is still less than 10 microamperes, being 0.001/10000=0.1 microampere. At position 10, however, relay 13K is energized, contact 13K$a$ moves downwardly and contact 13K$b$ closes. Now "0" lamp OL$a$ is lit by application of voltage B' via contact 13K$a$. Resistor R120 now is removed from the input circuit by closure of contact 13K$b$ and all resistance in the first resistor bank IB is shorted out. In other words, there is no resistance (other than the relatively low resistance of the sensing relay winding) in circuit with the input voltage. Consequently, the current now becomes greatly in excess of 10 microamperes and sensing relay contact M1$a$ moves to the right-hand position. At this time, the "0" lamp OL$a$ alone is lit and all contacts 4K$b$ to 13K$b$ are closed. With sensing relay contact 1M$a$ in the right-hand position, the voltage from battery E' is available at stationary contact arm 2D of the second level $S_B$ of switch S by way of contact 1M$a$ and line L2A.

Now the rotary contactor 2G of switch section $S_B$ is stepped to position 1 and relay 14K is energized. This causes contact 14K$a$ to move downwardly and contact 14K$b$ to open. The opening of contact 14K$b$ removes the short across bank IIIB of resistors R150 to R159 and the input circuit includes the ten 100-ohm resistors R150 to R159 of resistor bank IIIB. It will be noted that none of the resistors R111 to R120 of bank IB and resistors R131 to R139 of bank IIB are effectively in circuit with the input voltage because all contacts 4K$b$ ... 23K$b$ are closed. The current in the input circuit is now 0.001/1000=1 microampere.

Since the current is less than 10 microamperes, the relay contact 1M$a$ moves to the left-hand position and the voltage E' no longer is supplied by way of line 2A to switch section $S_B$. When rotary contactor 2G arrives at position 2, there is no voltage E' available at switch level $S_B$, so that relay 15K is not energized. Likewise, the rotary contactor 2G, in moving through positions 3 to 10 is functionally inactive, since there is no voltage over line 2A to switch section $S_B$; relays 16K to 23K are not energized. At the time position 10 of rotary contactor 2G of switch level $S_B$ is reached, the only lamp illuminated is "0" lamp OL$b$ connected across lamp battery B' by way of contact 23K$a$. At this instance, the current is still the same as that existing when relay 14K was energized, namely, 1 microampere. The current, still being less than 10 microamperes, the sensing relay contact 1M$a$ remains at the left-hand position. The voltage E' available at line 1L next is applied to stationary contact arm 3D of switch section $S_C$. The voltage E' has no effect on relays 4K to 13K since, by this time, the rotary contactor 2G of switch section $S_A$ has rotated out of contact with the positions 1 to 10 of switch level $S_A$. When rotary contactor 3G of switch level $S_C$ reaches position 1, relay 24K is operated, contact 24K$a$ moves downwardly to permit lamp battery B' to energize "9" lamp 9L$b$ via contact 24K$a$ and 25K$a$, and switch contact 24K$b$ closes to effectively remove resistor R150 from the input circuit. The resistance now in the circuit with the input voltage to be measured is 900 ohms and the current is 0.001/900=1.11 microamperes. At position 2, relay 25K is energized, contact 25Ka moves downwardly and contact 25Kb closes. The "8" lamp 8Lb is energized from battery B' via contacts 25Ka and 26Ka and "9" lamp 9Lb is extinguished. Also, resistor R151 is removed from the circuit, leaving 800 ohms in circuit with the unknown voltage. The input current now is 0.001/800=1.25 microamperes. It can be shown that the current will not increase sufficiently to reach the 10-microamperes operating level at position 8 of rotary contactor W3 of switch level $S_C$, since the resistance still will be 200 ohms and the current 0.001/200=5 microamperes. At position 9 of rotary contactor 3G of switch level $S_C$, however, relay K32 is energized, contact 32Ka moves downwardly and contact 32Kb closes. Now, lamp battery B applies voltage only to "1" lamp 1Lc (via contacts 32Ka and 33Ka); resistor R158 is shorted out, leaving only the 100 ohms of resistor R159 in the input circuit. The current now is 0.001/100=10 microamperes and the sensing relay contact 1Ma moves to the right, removing voltage E' from line 1L so that relay 33K is not energized, even though rotary contactor 3G of switch level $S_C$ is in the 10 position. Consequently, "0" lamp OLa is not energized. This completes the switch operating cycle and the homing switch is back to the home position. The lamps illuminated are 0, 0, and 1, indicating that the voltage at input terminals 1T, 2T, is 0.001 volt.

If the maximum voltage to be measured is 0.1 volt and the sensing relay is to operate at the same current level as before, namely, 10 microamperes, the total resistance of the first resistor bank IB will have to be changed from 10,000 ohms to 1,000 ohms. In other words, for the same sensing relay sensitivity, decreasing the maximum voltage to be measured by a factor of 10 requires the reduction of the magnitude of each of the 10 resistors of resistor bank IB likewise by the factor of 10. This would further require that the magnitude of the resistors of the second resistor bank IIB be reduced from 1,000 ohms to 100 ohms and that the size of the resistors of the third resistor bank IIIB be reduced from 100 ohms to 10 ohms. In this case, if the input voltage were 0.0001 volt, the initial current with rotary contactor 1G at position 1 of switch level $S_A$ would be 0.0001/10000=0.01 microampere, at position 9 it would be 0.0001/1000=.1 microampere, and at position 10 it would finally surpass 10 microamperes, resulting finally in illumination of "0" lamp OLa and movement of relay contact 1Ma to the right. With rotary contactor 2G at position 1 of switch level $S_B$, the current would flow through 10 10-ohm resistor of resistor bank IIIB and would be 0.0001/100=1 microampere. With rotary contactor 3G at position 10 of switch level $S_B$, the current would be very large and sensing relay contact 1Ma would move to the left-hand position. During the stepping of switch level $S_B$ through positions 2 to 10, there would be no voltage at switch level $S_B$ by way of line 2A. The only lamp associated with switch $S_B$ which would be illuminated would be "0" lamp OLb. Similarly, with rotary contactor 3G at position 1 of switch level $S_C$, the resistance in circuit with the measured voltage would be 0.001/90 or 1.11 microamperes. Finally, with rotary contactor 3G at position 9 of switch level $S_C$, the current would be 0.001/10=10 microamperes and the relay contact 1Ma would move to the right, removing voltage E' from line 1A so that, with rotary contactor 3G at the 10 position of switch level $S_C$, relay 33K would not be energized. Consequently, the "1" lamp 1Lc would be the last lamp energized and, as before, one would have the lamps 0, 0, and 1 associated with the three stepping switch levels $S_A$, $S_B$, and $S_C$, respectively, illuminated. This would correspond to a voltage at the input terminals 1T, 2T of 0.001 volt.

In order to insure understanding of the device of the invention, another example of operation will be given wherein it is assumed that the magnitude of the unknown voltage $V_x$ is 0.467 volt. Initially, the shorting contact 3Ka is closed and the current through the sensing relay winding is much greater than 10 microamperes. The shorting switch 3Ka thus opens and the resistive circuit across the input terminals includes the 10 10,000-ohm resistors R111 to R120 of resistor bank IB. The resistors of resistor bank IIIB are shorted out by closed contact 14Kb. The current, thus, is 0.467/100000=4.7 microamperes. Since the current is less than 10 microamperes, sensing relay contact 1Ma moves to the left and voltage E' is applied via line 1A to stationary contact arm 2D of switch level $S_A$. With rotary contactor 1G at position 1, relay 4K operates, contact 4Ka moves down and "9" light bulb 9La is lit by lamp battery B'. Also contact 4Kb moves down, removing resistor R111 from the input circuit. Now the current is 0.467/90000=5.2 microamperes. With rotating contactor 1G at position 2, relay 5K operates, contact 5Ka moves downwardly, while contact 4Ka is still held down by the holding current in relay 4K. So "9" lamp 9La goes out and lamp 8La is lit. As contact 5Kb moves downwardly, it removes resistor R112 from the input circuit, whereupon the current is increased to 0.467/80000=5.85 microamperes. When rotary contactor 1G is at position 3 of switch level $S_A$, relay 6K operates, contact 6Ka moves downwardly, "7" lamp 7La glows and lamp 8La goes out. It will be noted that contacts 4Ka and 5Ka remain held down by the holding current in relays 4K and 5K. As contact 6Kb moves downwardly, resistor R113 is removed from the input circuit and the current becomes 0.467/70000=6.7 microamperes. When rotary contactor 1G is at position 4 of switch level $S_A$, relay 7K is energized, contact 7Ka moves downwardly to permit "6" lamp 6La only to glow. Also, contact 7Kb closes, thereby removing resistor R114 from the circuit, so that the current becomes 0.467/60000=7.8 microamperes. When rotating contactor 1G is at position 5 of switch level $S_A$, relay 8K operates and contact 8Kb moves downwardly to permit energization of "5" lamp 5La. Furthermore, contact 8Kb closes, removing resistor R115 from the input circuit, so that the current becomes 0.467/50000=9.3 microamperes. Finally, when rotary contactor 1G is at position 6 of switch level $S_A$, relay 9K operates, contact 9Ka moves down and contact 9Kb closes. The lamp battery now supplies voltage only to "4" lamp 4La, while resistor R116 is shorted out by closing contact 9Kb. The current now becomes 0.467/40000=1.6 microamperes. Since the current has now exceeded 10 microamperes, contact 1Ma of sensing relay 1M moves to the right. The voltage E' no longer is made available via line 1A to switch $S_A$ and relays 10K to 13K are not energized when the rotating contactor 1G is at positions 7 to 10 of switch level $S_A$. Lamp 4La, consequently, remains on because the holding current in relay 9K holds contact 9Ka in the downward position and the current flows through "4" lamp 4La, via contact 9Kb and contact 10Ka. This indicates that the first digit of the voltage to be measured is 4. The four resistors R117 to R120 remain in the input circuit, since contacts 10Kb to 13Kb cannot be closed; 40,000 ohms are thus in the input circuit at the time that contact 1Ma moves to the right.

After contact 1Ma has moved to the right, the voltage E' is applied via line 2A to switch level $S_B$. When rotating contactor 2G of switch level $S_B$ is at position 1, the voltage across relay 14K energizes 14K and contact 14Ka moves downwardly. The voltage from lamp battery B' lights "0" lamp OLb via contacts 14Ka and 15Ka. Contact 14Kb moves upwardly, removing the short across the third bank IIIB of resistors including resistors R150 to R159. The input circuit now consists of the 40,000 ohms in bank IB, 1,000 ohms (R150 to R159) in bank IIIC, zero resistance in bank IIB (since all contacts 15Kb to 23Kb are closed) and the negligible resistance of the sensing relay winding. The current thus becomes 0.467/41000=11.4 microamperes. Since the current is still greater than 10 microamperes, contact 1Ma remains to the right. When rotary contactor 2G of switch level $S_B$ is at position 2, relay 15K is energized and contact 15Ka moves downwardly. The lamp battery B' lights "1" lamp 1Lb by way of contacts 15Ka and 16K. Lamp LOb now is extinguished. Contact 15Kb opens and resistor R131 is added to the input circuit; since the effective resistance is now increased to 42,000 ohms the current decreases to 0.467/42000=11.1 microamperes. In position 3 of switch level $S_B$, relay 16K is energized and contact 16Ka moves downwardly to illuminate "2" lamp 2Ld by way of contacts 16Ka and 17Ka, while "1" lamp 1Lb is extinguished. Contact 16Kb opens and resistor R132 is added into the input circuit. The current now becomes 0.467/43000=10.9 microamperes. With rotary contactor 2G of switch level $S_B$ in position 4, relay 17K is energized. Contact 17Ka moves downwardly and "3" lamp 3Lb is lit by way of contacts 17Ka and 18Ka, while "2" lamp 2Lb is extinguished. Contact 17Kb opens and resistor R133 is added in the input circuit. The current now becomes 0.467/44000=10.6 microamperes. With rotary contactor 2G of switch level $S_B$ in position 5, relay 18K is energized, contact 18Ka moves downwardly and "4" lamp 4Lb is lit, while contact 18Kb opens to add resistor R134 into the circuit. The current is now 0.467/45000= 10.3 microamperes. When rotary contactor 2G of switch level $S_B$ is at position 6, relay 19K is energized, contact 19Ka moves down to permit energization of lamp 5 and contact 19Kb opens, inserting resistor R135 into the circuit. The current now is 0.467/46000=0.1 microamperes. In position 7 of switch level $S_B$, relay 20K is energized, causing contact 20Ka to move downwardly and contact 20Kb to open. This causes "6" lamp 6Lb to light because of the voltage from battery B' being applied thereto by way of contacts 20Ka and 21Ka. All other lamps are out. Resistor R136 is added to the circuit by virtue of opening of the shorting contact 20Kb. The current in the circuit now is 0.467/47000=9.8 microamperes. Since the current now has dropped to a value less than 10 microamperes, contact 1Ma moves to the left, removing the voltage E' from switch level $S_B$; therefore, relays 20K to 23K cannot operate even though switch level $S_B$ is in positions 8 to 10. The "6" lamp 6Lb indicates that the second digit of the voltage to be measured is 6.

With contact 1Ma in the left position, the voltage E' is supplied via line 1A to stationary contact arms 1D and 3D of switch levels $S_A$ and $S_C$; this voltage E' has no effect on switch level $S_A$ at this time; however, the rotary contactor 1G of switch level $S_A$ has long since passed by the switch positions 0 to 10. When the rotary contactor 3G of switch level $S_C$ is in position 1, relay 24K is energized and contact 24Ka moves downwardly and contact 24Kd closes. The "9" lamp 9Lc is energized by way of contacts 24Ka and 25Ka and resistance R150 is removed from the circuit by the short circuit effected by closure of contact 24Kb. In other words, 100 ohms has been removed from the 47,000 ohms previously in the circuit. The current now becomes 0.467/46900=9.8 microamperes. When the rotary contactor 3G of switch level $S_C$ is in position 2, relay 25K is energized, contact 25Ka moves downwardly and contact 25Kb closes. The "9" lamp 9Lc now goes out and lamp 8Lc is lit by virtue of application of lamp battery voltage to lamp 8Lc via contacts 25Ka and 26Ka. Since contact 25Kb shorts out resistor R151, the resistance in the circuit is reduced by another 100 ohms to 46,800 ohms. The current is then 0.467/46800=9.9 microamperes. When rotary contactor 3G of switch level $S_C$ is at position 3, relay 26K is energized, contact 26Ka moves downwardly and contact 26Kb closes. The "7" lamp 7Lc is energized via contacts 26Ka and 27Ka and lamp 8Lc is extinguished. Closure of contact 26Kb removes R152 from the circuit, leaving 46,700 ohms in the input circuit. The current now is 0.467/46700=10.0 microamperes. Since the current is now at the operating point of sensing relay 1M, contact 1Ma moves to the right and voltage E' is removed from switch level $S_C$. Consequently, relays 27K to 33K cannot be energized when the rotary contactor 3G of switch level $S_C$ is in positions 4 to 10. The "7" lamp 7Lc is the only lamp associated with switch level $S_C$ which is lit, indicating that the third digit of the voltage to be measured is 7. It is now evident that the voltage to be measured at the input terminals 1T, 2T is 0.467 volt.

This invention is not limited to the particular details of construction, materials, and processes described, as many equivalents will suggest themselves to those skilled in the art. It is desired, accordingly, that the appended claims be given a broad interpretation commensurate with the scope of the invention within the art.

What is claimed is:

1. A digital voltmeter comprising input terminal means across which an input voltage to be measured is applied, a plurality of pairs of banks of resistors, each bank consisting of a plurality of resistors of equal magnitude connected in series and the second of each pair of banks corresponding to the next lower order of significant digit of said voltage to be measured than that of the first of each pair of banks, the magnitude of the resistors in a given bank being digitally related to the magnitude of the resistors in magnitude of the resistors in succeeding ones of said resistor banks, a current sensing relay having a current sensing coil connected in series with a selectable portion of said resistor banks directly across said input terminal means and also a contactor which moves from a first position to a second position when the current in said sensing coil exceeds a predetermined threshold current equal to the ratio of the minimum increment of voltage to be measured and the resistance of said sensing coil, control means having portions switching corresponding ones of said banks of resistors, said portions being actuated only when said sensing relay contactor is in one only of said two positions, said control means being responsive to application of said input voltage to said terminal means to introduce the second of a given pair of said banks as an entirety in series with said current sensing coil, to introduce incrementally the resistors of the first of the first pair of banks in series with said sensing coil and the second bank of said first pair until the current falls below said threshold current, and to decrease the resistance of the second bank of said first pair of banks incrementally until the current exceeds the threshold current, and indicating means actuated by a portion of said control means for indicating the corresponding digital value of said input voltage.

2. A digital voltmeter according to claim 1 further including a resistive element in series with said sensing device and said selectable portions of said resistor banks for modifying the range of input voltage to be measured.

3. A digital voltmeter as recited in claim 1 wherein said control means includes means for introducing additional pairs of banks of resistors corresponding to additional desired significant digits of voltage to be indicated.

4. A digital voltmeter comprising input terminal means across which an input voltage to be measured is applied, an odd number of banks of resistors, each bank consisting of a plurality of resistors of equal magnitude connected in series, a given one of said banks corresponding to the next lower order of significant digits of the input voltage to be measured than the bank immediately preceding, the magnitude of the resistors in a given bank being digitally related to the magnitude of the resistors in succeeding ones of said resistor banks, a current-sensing relay having a current sensing coil connected in series with a selectable portion of said resistor banks directly across said input terminal means and also a contactor which moves from a first position to a second position when the current in said sensing coil exceeds a predetermined threshold current equal to the ratio of the minimum increment of voltage to be measured and the resistance of said sensing coil, control means having portions switching corresponding ones of said banks of resistors, each of said portions being actuated only when said sensing relay contactor is in one only of said two positions, said control means being responsive to application of said input voltage to said terminal means to introduce the first of said banks as an entirety in series with said sensing coil, to decrease incrementally the resistance of said first bank until the current exceeds the threshold value, to introduce the third of said banks as an entirety in series with said current-sensing coil and the effective portion of said first bank, to increase incrementally the resistance of the second of said banks connected in circuit with said third bank and the effective resistance of said first banks until the current falls below said threshold current, and to decrease incrementally the resistance of said third bank until the current exceeds said threshold current, and a plurality of groups of indicating means each corresponding to one of said banks and actuated by a portion of said control means for indicating a corresponding digital value of said input voltage.

5. A digital voltmeter according to claim 4 further including a resistive element in series with said sensing device and said selectable portions of said resistor banks for modifying the range of input voltage to be measured.

6. A digital voltmeter as recited in claim 4 wherein said control means includes means for introducing additional pairs of banks of resistors corresponding to additional desired significant digits of voltage to be indicated.

* * * * *